Feb. 3, 1925.
W. B. WALTERS
AUTOMATIC GAS CUT-OFF
Filed April 14, 1924
1,524,768
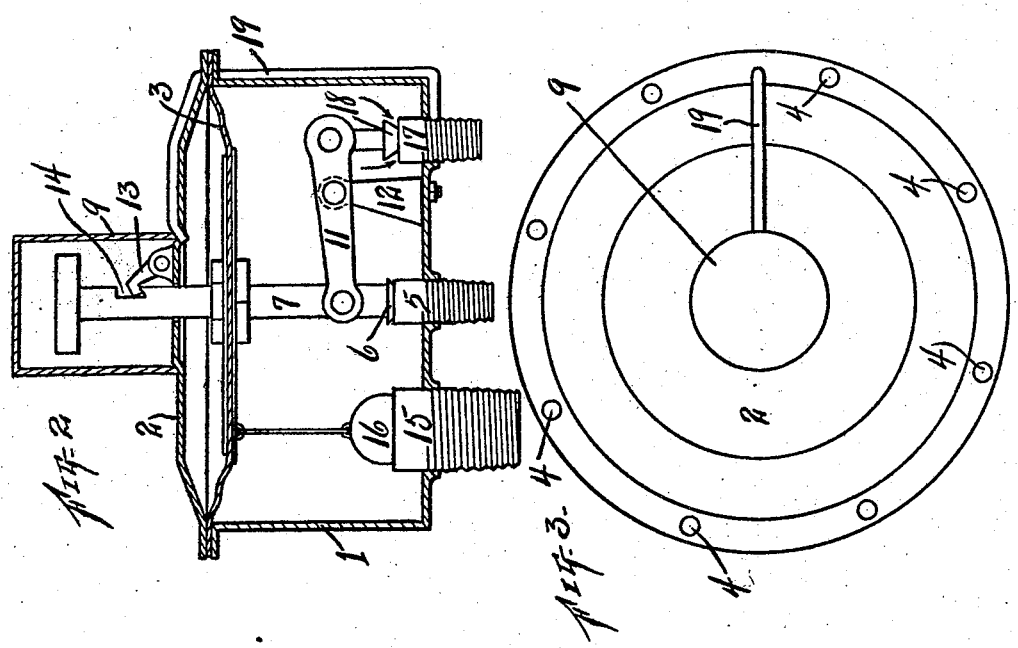
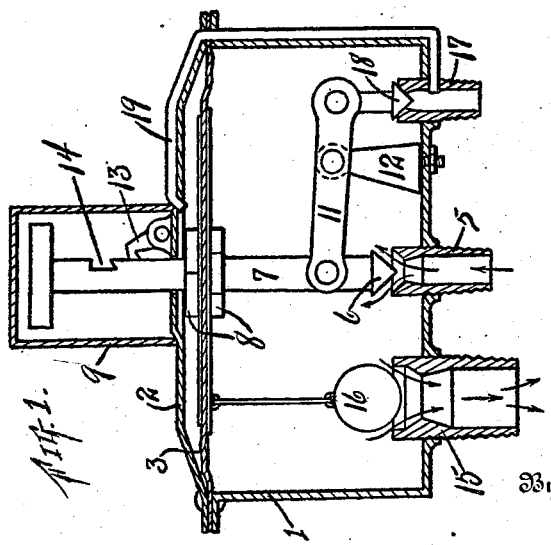
Inventor
Walter B. Walters
By *A. L. Jackson*
Attorney Patented Feb. 3, 1925.

1,524,768

UNITED STATES PATENT OFFICE.

WALTER B. WALTERS, OF MINERAL WELLS, TEXAS.

AUTOMATIC GAS CUT-OFF.

Application filed April 14, 1924. Serial No. 706,423.

*To all whom it may concern:*

Be it known that I, WALTER B. WALTERS, a citizen of the United States, residing at Mineral Wells, in the county of Palo Pinto and State of Texas, have invented certain new and useful Improvements in Automatic Gas Cut-Offs, of which the following is a specification.

My invention relates to automatic gas cut-offs for gas; and the object is to provide a safety device which will prevent the escape of gas in case of accidental stopping of the gas, also for preventing the escape of gas in case of accidental disconnection of the gas line and to provide a simple apparatus which will automatically close the gas discharge in case of stoppage of the gas so that if the gas comes back on or starts to flow again, no gas can escape. Another advantage is that if there is a disconnection of the gas line or pipe between the improved gas cut-off the stove or furnace or burner, the apparatus will automatically cut the gas off because the pressure on the diaphragm will be relieved. Other objects and advantages will be fully explained in the following description and the invention will be more particularly pointed out in the claims.

Reference is had to the accompanying drawings which form a part of this application.

Fig. 1 is a vertical section of the casing of the apparatus, showing the interior mechanism when the gas is in operation or flowing. Fig. 2 is a similar view, showing the position of the work-parts when the gas is not flowing or working and which has been automatically cut-off. Fig. 3 is a plan view of the same.

Similar characters of reference are used to indicate the same parts throughout the several views.

The gas cut-off is provided with a casing 1 and a cover 2 therefore. A flexible diaphragm 3 is provided and caught between the cover 2 and the casing 1 and clamped by screws 4. A gas inlet 5 is provided and a valve 6 is provided and adapted to close the gas inlet 5. The valve 6 is provided with a stem 7 which projects through the diaphragm 3 and adjustable thereto by nuts 8 so that the stem 7 will move with the diaphragm 3. The stem 7 projects through the cover 2. A hood 9 is mounted over the upper end of the stem 7 and made gas tight. The stem 7 is pivotally connected to a lever 11 which is provided with a fulcrum 12. A pivoted latch 13 is provided for locking the valve 6 closed. The stem 7 is provided with a notch 14 for the latch 13 so that the latch 13 will hold the valve 6 closed until the latch is manually or otherwise released. An outlet 15 is provided for the gas for consumption and a valve 16 is provided for closing this valve when no gas is to be used. A gas escape 17 is provided for any gas that might remain in the casing 1 after the use of the gas is stopped. A valve 18 is provided for closing the outlet 17. This valve 18 is carried by the lever 11 to which the valve stem is pivotally connected. During operation, the valves are in the positions shown in Fig. 1. To start operation, release the latch 13 and turn the gas in through inlet 5. The gas will force the diaphragm 3 upwardly and this diaphragm will open the valve 16 and at the same time close the valve 18. If the gas should be cut-off or cease flowing, the diaphragm 3 will descend and close the valve 6 and the valve 16 and open valve 18. The latch 13 will automatically lock the stem 7 against movement. If any gas should escape upwardly in the space between the diaphragm and the cover 2, it will escape through a waste pipe 19 which projects into this space and then down the side of the casing 1 and into the outlet connection 17.

It is apparent that various changes may be made in the construction of the cut-off without departing from my invention.

What I claim, is,—

1. A gas cut-off comprising a casing and a cover closing said casing gas-tight, a gas inlet and a gas outlet, valves for opening and closing said inlet and outlet, a flexible diaphragm spanning said casing approximately horizontally, a rigid stem for said inlet valve fixedly connected to said diaphragm and a cord suspending the outlet valve from said diaphragm, said diaphragm being movable by the gas pressure for operating said valves, and means for locking said valves closed.

2. A gas cut-off comprising a casing and a cover closing said casing gas-tight, a flexible diaphragm spanning the interior of said casing and caught in between said cover and casing, a gas inlet and a gas outlet, inlet and outlet valves for opening and closing said inlet and outlet, a stem connected to said inlet valve and fixedly connected to said diaphragm and projecting through said cover and provided with a locking notch, a latch pivotally mounted on said cover and adapted to engage said notch for locking said stem when the inlet valve is closed, a hood for inclosing said latch and the end of said stem, a cord suspending said outlet valve from said diaphragm, an outlet for non-used gas connected to said casing a valve for closing the same, said diaphragm being movable by the pressure of gas in said casing, and a lever fulcrumed in said casing and operatively connected to said last named valve and to said stem.

3. A gas cut-off comprising a casing and a cover closing said casing gas-tight, a gas inlet and a gas outlet, valves for opening and closing said inlet and outlet, a flexible diaphragm operatively connected to said valves and movable by the pressure of gas in said casing for operating said valves, an escape for non-used gas connected to said casing and a valve for opening and closing said escape, means operatively connected to said last named valve and to the first named valves for closing the escape valve when the other valves are opened and vice versa, and an escape for gas from said casing on the opposite side of said diaphragm from said valve connected to said gas escape.

In testimony whereof, I set my hand, this 7th day of February, 1924.

WALTER B. WALTERS.